United States Patent Office 3,523,248
Patented Aug. 4, 1970

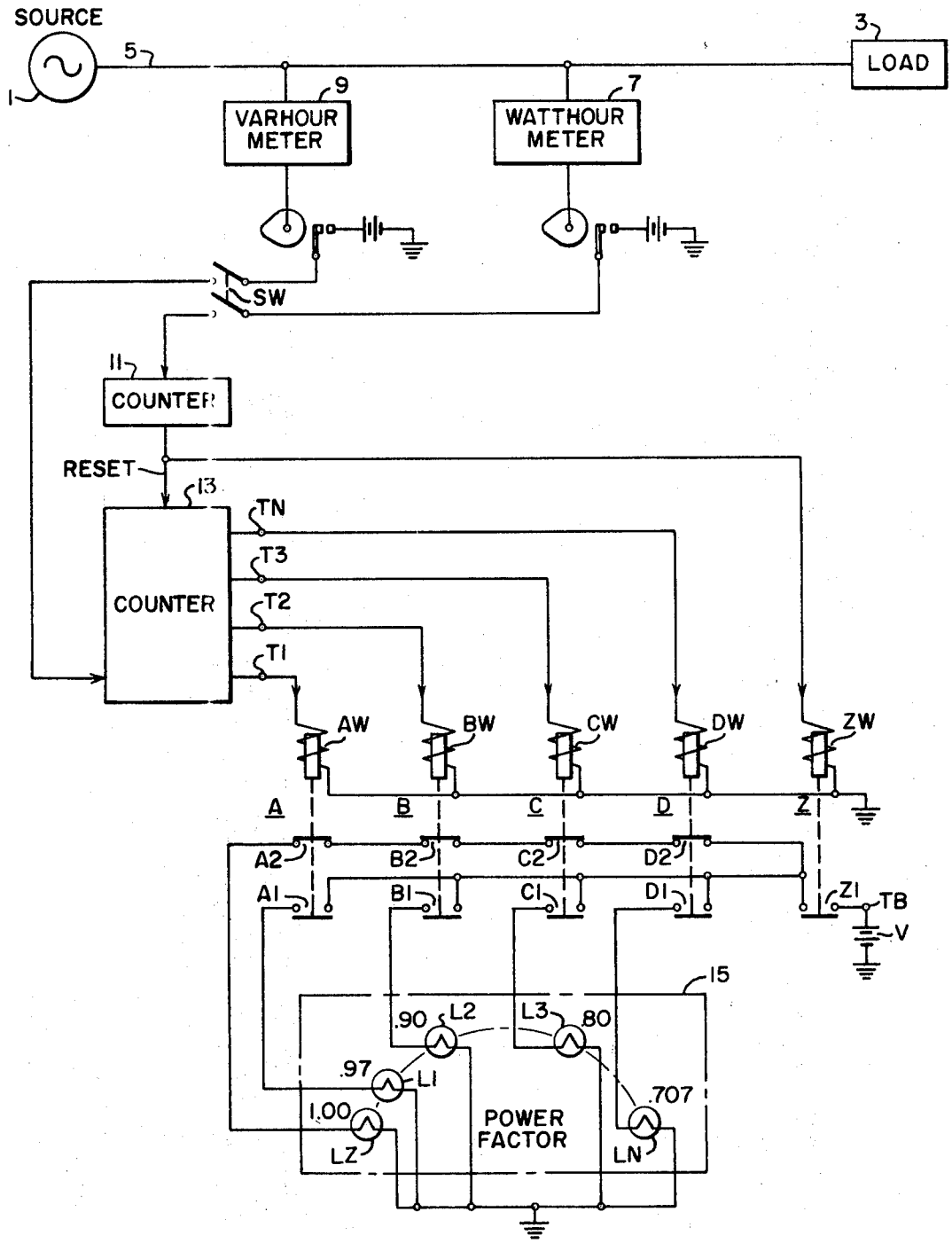

3,523,248
POWER FACTOR MEASURING DEVICE RESPONSIVE TO THE RATIO OF VARHOUR PULSES TO WATT-HOUR PULSES
David F. Wright, Lake Park, Fla., assignor to Westinghouse Electric Corporation, Pittsburgh, Pa., a corporation of Pennsylvania
Filed Oct. 4, 1966, Ser. No. 584,259
Int. Cl. G01r 7/00
U.S. Cl. 324—141   5 Claims

ABSTRACT OF THE DISCLOSURE

First and second pulses are generated to represent reactive and real energy in an alternating electric circuit. A first counter provides separate outputs for different numbers of the first pulses to light different lamps corresponding to such numbers to indicate power factor. A second counter resets the first counter at the end of each cycle containing a predetermined number of the second pulses.

---

This invention relates to pulse-operated devices which are responsive to a relationship between real and reactive volt amperes in an alternating-current system and it has particular relation to power-factor meters.

It is well known in the art to generate pulses which represent one function of an alternating current quantity. As an example such a pulse may represent a predetermined number of reactive-volt-ampere-hours or varhours. It is also known in the art to generate pulses representative of a second function of an alternating current quantity. As an example each such pulse may represent a predetermined number of real-volt-ampere-hours or watt-hours.

When such pulses are available it is desirable to derive from such pulses certain relationships between the quantities represented by the pulses, such as power factor.

In accordance with the invention a function such as power factor is ascertained by determining the number of one set of the above-mentioned pulses which occur in each of a plurality of cycles or intervals containing a predetermined number of the other set of pulses.

It is therefore an object of the invention to provide improved apparatus for deriving a function of an alternating-current quantity from pulses dependent on such quantity.

It is also an object of the invention to provide apparatus for deriving sets of pulses each dependent on a predetermined characteristic of an alternating current quantity and for ascertaining the number of pulses in one of the sets of pulses which occur in each cycle or interval containing the predetermined number of another of a set of pulses.

It is another object of the invention to provide apparatus for indicating power factor of an alternating quantity wherein the number of varhour pulses is determined for each interval or cycle containing a predetermined number of watt-hour pulses.

Other objects of the invention will be apparent from the following description taken in conjunction with the accompanying drawing in which the single figure represents a schematic view of an electrical system embodying the invention.

Referring to the drawing the single figure shows a source of electric energy 1 which supplies alternating current to a load 3 over an electric circuit 5. The source 1 may be a single-phase or a polyphase source designed to operate at any suitable frequency which may be a power frequency such as 60 cycles per second. The electric circuit 5 shown in single-line form may be a single-phase or a polyphase circuit depending on the nature of the source 1.

Pulses are generated which are representative of certain characteristics of the volt-amperes supplied by the source 1 to the load 3. Thus a watt-hour meter 7 produces pulses at a rate dependent on the real-volt-ampere-hours or watt-hours supplied by the source to the load 3. A varhour meter 9 generates pulses at a rate dependent on the reactive-volt-ampere-hours or varhours supplied by the source 1 to the load 3. Such meters are well known in the art.

The pulse output of the watt-hour meter 7 is applied to the input of a counter 11 through a first pole of a two-pole, single-throw switch SW. For each application to the input of the counter 11 of N watt-hour pulses, one output pulse is produced to define a cycle or interval.

The varhour pulses generated by the varhour meter 9 are applied to the input of a counter 13 through a second pole of the switch SW. This counter produces a separate output for each varhour pulse applied thereto during each cycle or interval. Thus the first varhour pulse during a cycle or interval results in the application of an output to a terminal T1. The second varhour pulse applied to the input of the counter after the beginning of such cycle or interval produces a second output which is applied to a terminal T2. The third varhour pulse applied to the counter after the beginning of the cycle or interval results in the application of an output to a terminal T3. In this way a separate output is applied to a separate terminal for each varhour pulse until the varhour pulse applied to the counter 13 after the beginning of a cycle or interval applies an output to an output terminal TN.

It will be noted that the output of the counter 11 supplies an input to the reset terminal of the counter 13. Consequently each application of N watt-hour pulses to the input of the counter 11 results in the application of a reset pulse to the counter 13 which resets the outputs applied to the terminals T1 to TN to their zero values. Counters which operate in this manner are well known in the art.

The larger the number of pulses represented by N the greater the accuracy of the device. However, the invention may be described adequately for a value of N=4 and this value will be assumed to be employed for present purposes.

The outputs of the counters 11 and 13 are employed for controlling an indicator 15 which indicates a function of a volt ampere quantity supplied by the source 1 to the load 3. In the preferred embodiment of the invention shown in the drawing the indicator depicts power factor.

The indicator 15 includes a number of electro-responsive indicating devices. In a preferred embodiment of the invention the indicating devices are in the form of lamps L1, L2, L3, LN and LZ.

The first varhour pulse generated after the beginning of a cycle or interval causes the illumination of the lamp L1. If we assume that each cycle or interval includes four watt-hour pulses it follows that the illumination of the lamp L1 indicates that the power factor cannot exceed a value of .97.

The second varhour pulse generated after the beginning of a cycle or interval results in the illumination of the lamp L2. The presence of two varhour pulses in a cycle or interval containing four watt-hour pulses as shown by the illumination of the lamp L2 means that the power factor cannot exceed a value of .90.

In an analogous manner the generation of a third varhour pulse after the beginning of a cycle or interval results in the illumination of the lamp L3 to show that the power factor cannot exceed a value of .80. The generation of a fourth varhour pulse after the beginning of a cycle or interval results in the illumination of the lamp LN and indicates that the power factor cannot exceed a value of .707.

If no varhour pulse is generated during a cycle or interval the lamp LZ is illuminated to indicate that the power factor has a value of 1.00.

Preferably the lamps are spaced in accordance with the magnitudes of the power factors which they represent. In the drawing these lamps are shown spaced along a semi-circular path.

The lamps may be controlled from the counters in any suitable manner. In the embodiment of the drawing the control takes the form of five relays A, B, C, D and Z. Each of the relays is of an electromechanical design and includes an energizing winding identified by the reference character of the relay followed by the suffix W. Each of the relays also has a set of make or front contacts which is identified by the reference character employed by the relay followed by the suffix 1. Each of these sets of contacts is opened when the winding AW is deenergized and the relay is dropped out. Each set of contacts is closed when the winding associated therewith is energized and the associated relay is picked up.

The relays A, B, C and D also have sets of break or back contacts each of which is identified by the reference character for the relay followed by the suffix 2. Each of these sets of contacts is closed when the winding associated therewith is deenergized and the relay is dropped out. Each set of contacts is opened when the associated relay winding is energized and the relay is picked up.

When the terminal T1 is energized from the counter 13 to indicate the presence of at least one varhour pulse the winding AW is energized to pick up the relay A. This results in closure of the make contacts A1 to connect the lamp L1 between ground and a terminal TB through the make contacts Z1 of the relay Z. A source of voltage V for illuminating the lamp is connected between the terminal TB and ground. Consequently, when the relay Z is picked up at the end of a cycle or interval the lamp L1 is illuminated to indicate that at least one varhour pulse has been received during such cycle or interval. The relays A, B, C and D may have a slight delay in drop out to prevent dropout of any one of these relays, when picked up, before relay Z has an opportunity to close its contacts Z1.

In an analogous manner if two varhour pulses are received within a cycle or interval the relay B picks up to close its make contacts B1 for the purpose of connecting the lamp L2 across a source of voltage through the make contact Z1. When the make contact Z1 closes at the end of the cycle or interval the lamp L2 illuminates to indicate that the power factor for such interval cannot exceed a value of .90.

If three varhour pulses are received during a cycle or interval the relay C picks up to close its make contacts C1 thereby connecting the lamp L3 across its associated source of energy through the make contact Z1. At the end of the cycle or interval, closure of the contact Z1 results in illumination of the lamp L3 to indicate that the power factor cannot exceed a value of .80 for such cycle or interval.

If four varhour pulses are generated during a cycle or interval the relay D picks up to close its make contacts D1. This connects the lamp LN across its associated source of energy through the make contacts Z1. When these contacts close at the end of the interval the illumination of the lamp LN indicates that the power factor cannot exceed a value of .707.

If no varhour pulse is received during a cycle or interval the relays A, B, C and D all remain dropped out and their break contacts A2 to D2 remain closed. Consequently, when the make contacts Z1 close at the end of the interval the lamp LZ is connected through the break contacts A2 to D2 and the make contacts Z1 across its associated source of energy. The illumination of the lamp LZ indicates a power factor of 1.00 for the associated cycle or interval.

Let it be assumed that during one cycle or interval two varhour pulses are received and that the varhour meter 9 additionally has progressed ¾ of the way required to produce a third pulse. At the end of this cycle or interval the lamp L2 would be illuminated to indicate that the power factor cannot exceed .90. However, if the transmission of volt amperes by the circuit 5 remains at the same level for the succeeding cycle or interval, at the end of such succeeding cycle or interval the lamp L3 would be illuminated to indicate that the power factor cannot exceed .80. The observer then would understand that for the two cycles the power factor would have a value intermediate the values .80 and .90. By observing the frequency of illumination of the lamps in this manner the observer can obtain the good approximation of intermediate power-factor values.

I claim as my invention:

1. In a device responsive to a function of an alternating volt-ampere quantity supplied over an alternating-current electric circuit, means effective when energized from said alternating-current circuit for generating a plurality of successive first pulses each representing the reactive-volt-ampere-hours of an alternating quantity supplied over said alternating-current circuit, means effective when energized from said alternating-current circuit for generating a plurality of successive second pulses each representing the real-volt-ampere-hours of the alternating quantity supplied over said alternating-current circuit, indicating means for indicating a plurality of values of power factor, cycling means connected to said means for generating second pulses and adapted to provide a cycle signal after receiving a predetermined number of second pulses, operating means connected to said means for generating first pulses and to said cycling means, said operating means yielding an output indicating the number of first pulses received between outputs from said cycling means, means connecting said operating means output to said indicating means, said indicating means indicating the value of the power factor of the circuit depending upon the number of first pulses received during each cycle of the cycling means.

2. A device as claimed in claim 1 wherein said operating means includes means for indicating a particular value of the power factor when no first pulses occur during a cycle of the cycling means.

3. A device as claimed in claim 1 wherein said indicating means comprises a plurality of spaced lamps each representing a separate value of the power factor.

4. A device as claimed in claim 3 wherein said operating means includes means for indicating a particular value of the power factor when no first pulses occur during a cycle of the cycling means.

5. A power-factor meter comprising a device as claimed in claim 4 wherein said operating means comprises first counter means for producing a separate output for each of the first pulses occuring during each of said cycles, and said cycling means comprises a second counter means for counting said second pulses to produce an output pulse upon completion of each of said cycles, said lamps being arranged in a sequence representing progressively larger values of power factor, means coupling the output pulses from the second counter means to the first counter means for supplying said output pulses to said first counter means to reset the first counter means.

References Cited

UNITED STATES PATENTS

| | | | |
|---|---|---|---|
| 2,880,612 | 4/1958 | Coyne et al. | 324—79 X |
| 3,084,863 | 4/1963 | Du Vall | 324—142 X |

FOREIGN PATENTS 1,039,539   5/1953   France.

OTHER REFERENCES

Electronic Design, "Modulo-N Shift Counters," Rhoades, pp. 48–52, Sept. 28, 1964.

RUDOLPH ROLINEC, Primary Examiner

R. J. CORCORAN, Assistant Examiner

U.S. Cl. X.R.

324—83, 140